United States Patent
Smartt et al.

(10) Patent No.: US 6,236,017 B1
(45) Date of Patent: May 22, 2001

(54) METHOD AND APPARATUS FOR ASSESSING WELD QUALITY

(75) Inventors: Herschel B. Smartt; Kevin L. Kenney; John A. Johnson; Nancy M. Carlson; Denis E. Clark, all of Idaho Falls; Paul L. Taylor, Boise, all of ID (US); Edward W. Reutzel, State College, PA (US)

(73) Assignee: Bechtel BWXT Idaho, LLC, Idaho Falls, ID (US)

( * ) Notice: Subject to any disclaimer, the term of this patent is extended or adjusted under 35 U.S.C. 154(b) by 0 days.

(21) Appl. No.: 09/346,196

(22) Filed: Jul. 1, 1999

(51) Int. Cl.[7] .................................................. B23K 9/095
(52) U.S. Cl. ........................................................ 219/130.01
(58) Field of Search ........................ 219/130.01, 130.21, 219/130.31, 130.32, 130.33, 130.5, 137.05

(56) References Cited

U.S. PATENT DOCUMENTS

| | | | |
|---|---|---|---|
| 5,221,825 | 6/1993 | Siewert et al. | 219/130.01 |
| 5,270,516 | * 12/1993 | Hamamoto et al. | 219/130.21 |
| 5,305,183 | * 4/1994 | Teynor | 219/130.01 |
| 5,571,431 | * 11/1996 | Lantieri et al. | 219/130.01 |
| 5,708,253 | * 1/1998 | Bloch et al. | 219/130.01 |
| 5,932,123 | * 8/1999 | Marhofer et al. | 219/130.01 |
| 6,031,203 | * 2/2000 | Suzuki et al. | 219/130.01 |

OTHER PUBLICATIONS

"How to Measure Success," N. A. Technologies Company (Advertisement).

* cited by examiner

*Primary Examiner*—Clifford C. Shaw
(74) *Attorney, Agent, or Firm*—Dahl & Osterloth LLP (57) ABSTRACT

Apparatus for determining a quality of a weld produced by a welding device according to the present invention includes a sensor operatively associated with the welding device. The sensor is responsive to at least one welding process parameter during a welding process and produces a welding process parameter signal that relates to the at least one welding process parameter. A computer connected to the sensor is responsive to the welding process parameter signal produced by the sensor. A user interface operatively associated with the computer allows a user to select a desired welding process. The computer processes the welding process parameter signal produced by the sensor in accordance with one of a constant voltage algorithm, a short duration weld algorithm or a pulsed current analysis module depending on the desired welding process selected by the user. The computer produces output data indicative of the quality of the weld.

15 Claims, 6 Drawing Sheets

METHOD AND APPARATUS FOR ASSESSING WELD QUALITY

CONTRACTUAL ORIGIN OF THE INVENTION

The United States Government has rights in this invention pursuant to Contract No. DE-AC07-94ID13223 between the United States Department of Energy and Lockheed Martin Idaho Technologies Company.

FIELD OF INVENTION

The present invention relates to welding systems in general and more specifically to methods and apparatus for assessing weld quality produced by arc welding systems.

BACKGROUND OF THE INVENTION

Arc welding processes are well-known in the art and have been used for decades in production and other environments to join together two or more separate items or workpieces. Depending on the particular application, the part produced by the arc welding process may be more or less tolerant to variations in weld quality. For example, certain applications may be quite tolerant to variations in weld quality, with a wide range of weld defects still resulting in an acceptable part. Other applications, however, are very fault intolerant, with very few, if any, weld defects being tolerable in an acceptable part.

In many production welding applications, the procedures for producing a weld for a given application are usually established in advance. Accordingly, the rejection rate (i.e., the rate at which a defective weld will result in a defective part) is usually highly correlated with the established welding procedure. If a good procedure is established, then the rejection rate usually will be low. On the other hand, a fundamentally unsound welding procedure will result in a relatively high part rejection rate.

Even if a sound welding procedure is developed, the ultimate part rejection rate depends to a large extent on how closely the system operator follows the established welding procedure. Unfortunately, however, the sources of welding problems are many, and may include problems relating to poor welder maintenance (e.g., worn contact tip, dirty gas cup, poor grounding), problems with the weld fixtures (e.g., misalignment, fixture cleanliness), problems relating to the welding robot (e.g., reprogramming of welding robots without consideration of the effects on weld parameters), automation fallibility (e.g., poor fit-up), procurement of low quality consumables, such as filler wire, or the degradation of the welding equipment itself Therefore, the failure to properly follow the established welding procedure can quickly result in an increased part rejection rate.

Another problem that is often faced in a production environment is that the system operator usually does not take the time to ascertain the underlying problem causing the defective welds. Instead, the problem is often corrected by simply varying certain readily adjustable welding process parameters until the problem goes away. While such a procedure may result in a short-term fix, repeated corrections may eventually cause the welding process parameters to drift so far out of the parameter space defined by the initial procedure that weld defects become difficult to diagnose and eliminate, resulting in higher defect rates than would otherwise be encountered by adhering to sound welding practices.

SUMMARY OF THE INVENTION

Apparatus for determining a quality of a weld produced by a welding device according to the present invention includes a sensor operatively associated with the welding device. The sensor is responsive to at least one welding process parameter during a welding process and produces a welding process parameter signal relating to the at least one welding process parameter. A computer connected to the sensor is responsive to the welding process parameter signal produced by the sensor. A user interface operatively associated with the computer allows a user to select a desired welding process. The computer processes the welding process parameter signal produced by the sensor in accordance with one of a constant voltage algorithm, a short duration weld algorithm or a pulsed current analysis module depending on the desired welding process selected by the user. The computer produces output data indicative of the quality of the weld.

Also disclosed is a method for determining a quality of a weld produced by a welding devices that comprises the steps of: Determining a desired welding process by selecting from among a constant voltage welding process, a pulsed current welding process, and a spot welding process; selecting a welding process algorithm based on the desired welding process, the step of selecting a welding process algorithm comprising the steps of selecting a constant voltage algorithm if the desired welding process is determined to be the constant voltage welding process; selecting a pulsed current analysis algorithm if the desired welding process is determined to be the pulsed current welding process; and selecting a short duration weld algorithm if the desired welding process is determined to be the spot welding process; detecting the initiation of a welding process; monitoring at least one welding process parameter during the welding process; processing the at least one welding process parameter in accordance with the selected welding process algorithm to assess the quality of the weld; and producing a user-discernable indication of the quality of the weld.

BRIEF DESCRIPTION OF THE DRAWING

Illustrative and presently preferred embodiments of the invention are shown in the accompanying drawing in which.

DETAILED DESCRIPTION OF THE INVENTION

Figure 1:
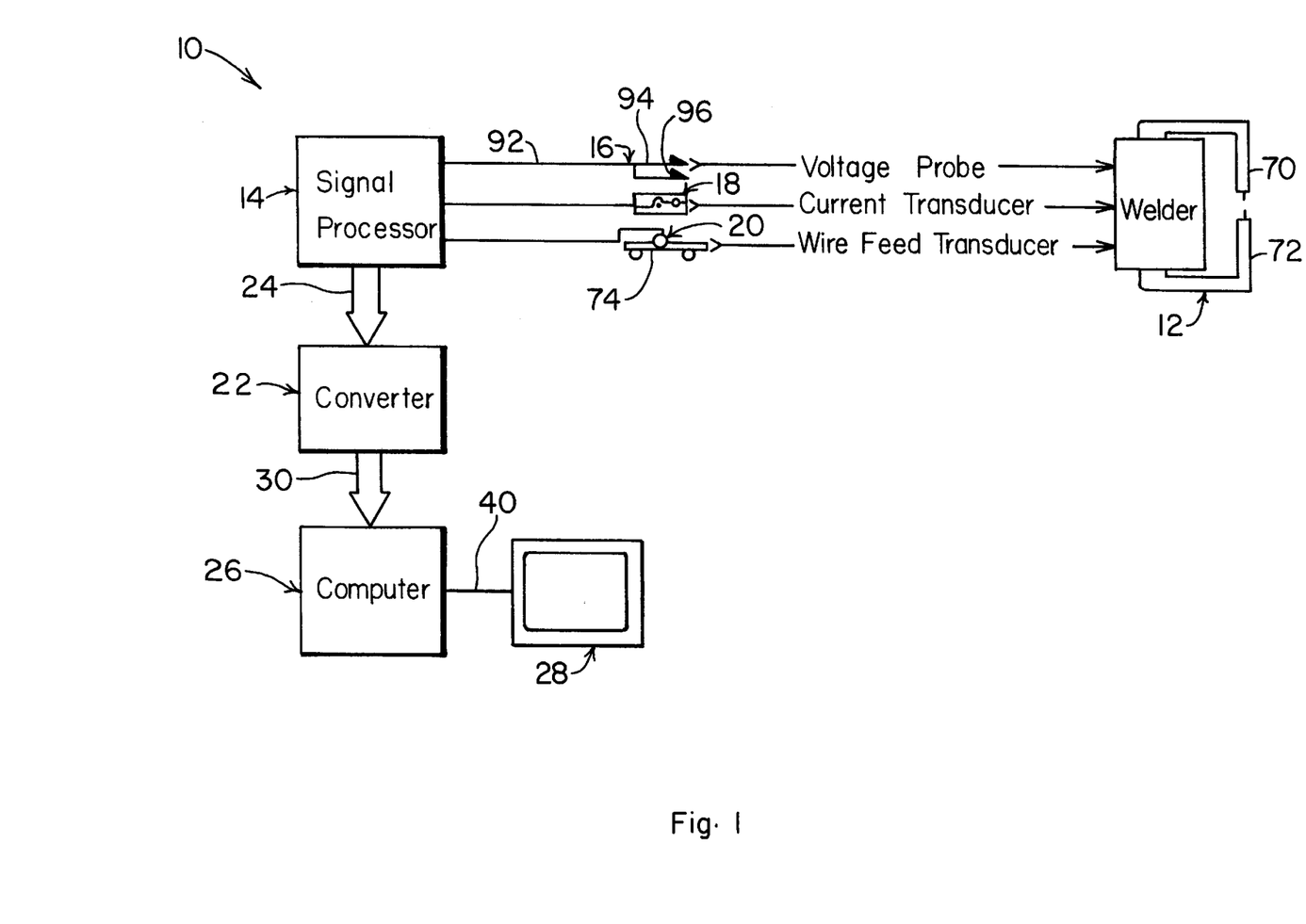
FIG. 1 is a schematic block diagram of apparatus for assessing weld quality according to one embodiment of the present invention.

Apparatus 10 for determining a quality of a weld (not shown) produced by a welding device 12 is shown in FIG. 1 and may comprise a plurality of hardware and software components for monitoring one or more welding process parameters in real-time and for producing output data that are indicative of the quality of the weld produced by the welding device 12. The hardware components are best seen in FIG. 1 and may comprise a signal processor 14 configured to receive input data (not shown) produced by one or more probes or transducers which, in the embodiment shown and described herein, may comprise a voltage probe 16, a current transducer 18, and a wire feed transducer 20. Alternatively, other types of probes and/or transducers may also be used, as will be described in greater detail below. The various probes and transducers (e.g., 16, 18, and 20) may be connected to appropriate portions of the welding device 12 in a manner that will be described in greater detail below. The signal processor 14 receives input data from the various probes and transducers (e.g., 16, 18, and 20) and filters and conditions the input signals from the various probes and transducers before transmitting them to a converter 22 as filtered analog data signals 24. Converter 22 receives the filtered analog data signals 24 from the signal processor 14 and converts the data signals 24 into digital input data 30 that are suitable for processing by the computer 26. The computer 26 processes the digital input data 30 received from the converter 22 according to one of several different algorithms and modules in order to produce output data 40 that are indicative of the quality of the weld produced by the welding device 12. The output data 40 from the computer 26 may be presented on a suitable display device 28, such as a CRT or LCD panel, associated with the computer 26.

Figure 2:
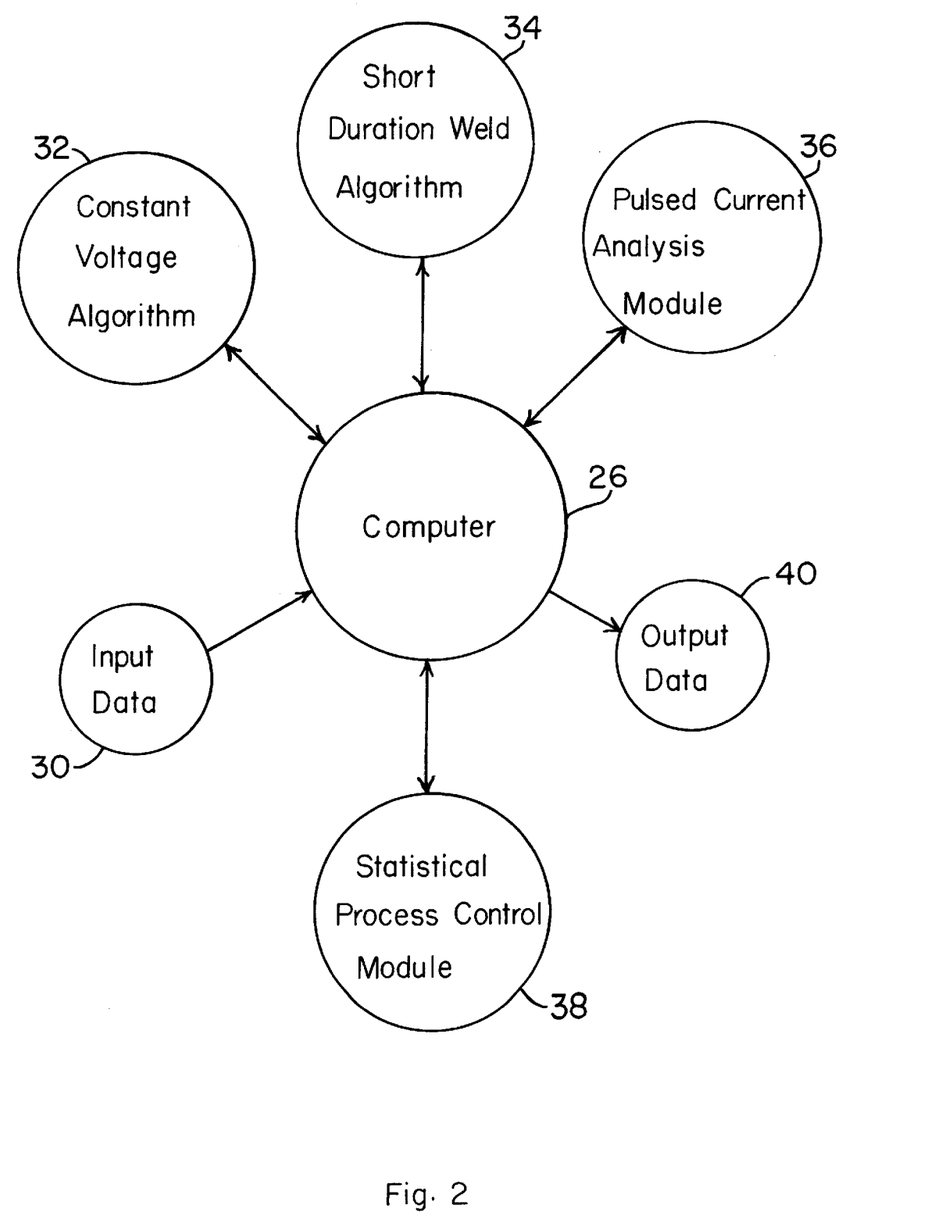
FIG. 2 is a schematic representation of the various algorithms and modules that may be accessed by a computer associated with the apparatus for assessing weld quality.

Referring now primarily to FIG. 2, the computer 26 may process the digital input data 30 received from the converter 22 (FIG. 1) according to one of several different software components (e.g., algorithms and modules) in order to produce output data 40 that are indicative of the quality of the weld produced by the welding device 12 (FIG. 1). More specifically, in the embodiment shown and described herein, the computer 26 may process the digital input data 30 according to a constant voltage algorithm 32, a short duration weld algorithm 34, a pulsed current analysis module 36, and a statistical process control module 38.

As will be discussed in much greater detail below, the particular algorithm or module (e.g., 32, 34, 36, or 38) that is selected by the computer 26 depends on the particular type of welding process that is being performed by the welding device 12, as well as on whether the system operator (not shown) desires to accumulate statistical data relating to the welding process. For example, in the embodiment shown and described herein, the particular type of welding process that is to be used drives the selection of the algorithms or modules 32, 34, and 36, whereas the system operator drives the selection of the statistical process control module 38. That is, the statistical process control module 38 is selected if the system operator desires the system to accumulate statistical data for the welding process.

Figure 3:
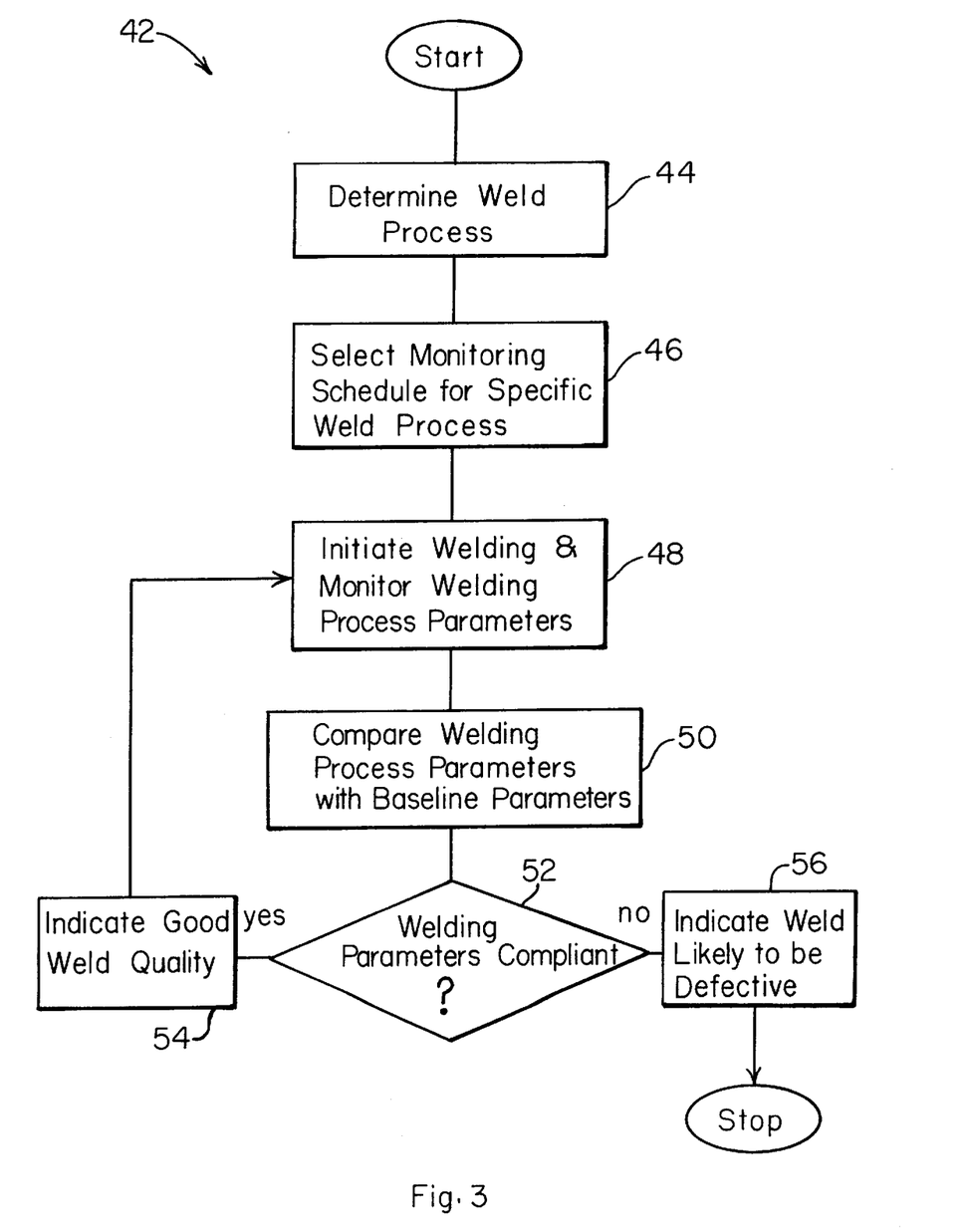
FIG. 3 is a flow diagram of a method for assessing weld quality according to one embodiment of the present invention.

Regardless of the particular software component (i.e., algorithm or module 32, 34, or 36) that is selected by the computer 26 to process the input data 30, the method or process 42 that is used to determine the weld quality is best seen in FIG. 3. The first step 44 in the process 42 is to determine the particular welding process that is to be performed by the welding device 12. As mentioned above, the determination of the particular welding process drives the decision as to whether the input data 30 are processed by the constant voltage algorithm 32, the short duration weld algorithm 34, or the pulsed current analysis module 36. For example, in the embodiment shown and described herein, the welding device 12 may comprise a gas metal arc welder (GMAW) that may be operated in either a constant voltage mode or a pulsed current mode. If so, the computer 26 may access either the constant voltage algorithm 32 or the pulsed current analysis module 36, as the case may be. Alternatively, the welding device 12 may comprise a gas tungsten arc welder (GTAW) configured for "spot welding" processes, in which case the computer 26 may process the digital input data 30 according to the short duration weld algorithm 34. In the embodiment shown and described herein, the computer 26 may also access the statistical process control module 38 if the system operator (not shown) so desires and if the welding process being performed is either of the GMAW processes. That is, in the embodiment shown and described herein, the statistical process control module 38 may not be used with the GTAW sport welding process. However, in an alternative embodiment, the statistical process control module 38 may be made to be used with the GTAW spot welding process, as will be explained in greater detail below. The statistical process control module 38 provides the system operator with statistical data compiled over a multiplicity of welds. Such statistical data may be used by the system operator to discover and track certain trends in the welding process.

After the particular weld process has been determined at step 44, the process 42 may proceed to step 46 which selects the appropriate algorithm or module for the particular weld process that is being performed by the welding device 12. As was mentioned above, if the welding device 12 is to perform constant voltage gas metal arc welding (GMAW), then the computer 26 will select the constant voltage algorithm 32 and will thereafter process the digital input data 30 according to the constant voltage algorithm 32. If, on the other hand, the welding device 12 is to perform pulsed current GMAW, then the computer 26 will process the digital input data 30 according to the pulsed current analysis module 36. Similarly, the digital input data 30 will be processed according to the short duration weld algorithm 34 if the welding device 12 is to be used to perform spot welding with a gas tungsten arc welder (GTAW). In any event, once the appropriate algorithm or module has been selected, the method 42 may proceed to step 48. In this step 48, the welding process is initiated. The apparatus 10 detects the initiation of the welding process and monitors at least one welding process parameter associated with the particular welding process that is being performed by the welding device 12.

As will be described in further detail below, the welding process parameters that may be monitored by the apparatus 10 include, but are not limited to, voltage, current, and wire feed speed. Depending on the particular welding process that is being performed, the foregoing parameters may be used to generate other (i.e., derived) welding process parameters. For example, if the welding process being performed is pulsed current GMAW, then the apparatus 10 uses the parameters of voltage and current to calculate or derive information relating to peak current, peak voltage, background (or base level) current, background voltage, duty cycle, and pulse frequency. Since these parameters are calculated or derived from the measured parameters (e.g., current and voltage), they may be referred to herein in the alternative as "derived welding parameters." Similarly, if the process being performed is a GTAW spot welding process, the apparatus 10 monitors welding current and derives therefrom information relating to the pulse width of the welding current. It should be understood that additional welding process parameters may also be monitored depending on the particular welding process that is being used, as will be described in greater detail below.

It is generally preferred, but not required, to configure the software so that the system operator (not shown) will have some control over certain aspects of the data acquisition process. For example, in one preferred embodiment of the present invention, the user may select the input channels from which data will be acquired, the sampling rate associated with the selected input channels, the amount of data to be acquired, and whether the data will be stored.

The welding process parameter or parameters are monitored "on-the-fly" (i.e., in real time) and, depending on the particular algorithm or module that is selected, are compared with a baseline parameter or parameters at step 50. However, before proceeding with the description, it should be noted that hereafter the description will refer to the terms "welding parameters" and "baseline parameters" in the plural, even though only a single welding process parameter and/or baseline parameter may be involved in a particular application. That is, the term "parameters" shall be construed to encompass both the singular and the plural. Accordingly, the present invention should be regarded as including situations wherein at least one welding parameter is monitored and compared with at least one baseline parameter.

It should also be noted that not all of the algorithms and modules compare the monitored welding parameters with the baseline parameters at step 50. For example, in the embodiment shown and described herein, the constant voltage algorithm 32, the short duration weld algorithm 34, and the statistical process control module 38 compare the monitored welding process control parameters with baseline parameters at step 50. However, the pulsed current analysis module 36 does not compare the monitored welding process control parameters with baseline parameters. Whether or not a given module or algorithm performs the comparison step 50 depends on whether it is desired to use the monitored welding parameters to make a determination as to weld quality. If it is not so desired, then the comparison step need not be performed.

Continuing now with the description, it should be remembered that the particular welding process parameters that are monitored are specific to the particular welding process that is being used. Similarly, the particular methodology that is used to compare the welding process parameters with the baseline parameters is also specific to the particular algorithm or module that is being used. As noted above, in the embodiment shown and described herein, the step 50 of comparing the monitored welding process parameters with the baseline parameters is performed by the constant voltage algorithm 32, the short duration algorithm 34, and the statistical process control module 38. The step 50 is not performed by the pulsed current analysis module 36. However, as also noted above, other embodiments of the invention may perform this step 50 for the pulsed current analysis module 36 if so desired.

If the welding parameters being monitored are compliant with the baseline parameters, as determined at step 52, the computer 26 will produce output data 40 (FIG. 2) indicating that the welding parameters are in compliance with the baseline parameters. Such compliance information are generally indicative of weld quality. Indeed, in the embodiment shown and described herein, the short duration weld algorithm 34 even provides as output a direct indication of weld quality. In any case, such indications may be presented via the display device 28 (FIG. 1) at step 54. At this point, the successfully welded workpiece (not shown) may be removed from the welding device 12 and another inserted in its place. The welding and monitoring processes may then be repeated beginning with step 48, as best seen in FIG. 3.

If, on the other hand, the computer 26 determines at step 52 that the welding parameters are not compliant with the baseline parameters, the process 42 will proceed to step 56 and indicate the non compliant welding parameters, which will generally mean that the weld is suspect and/or likely to be defective. Again, such an indication may be presented to the user via the display device 28 associated with the computer 26. At this point, it will usually be desirable to stop the welding process so that the system operator (not shown) can use the indication of parameter non-compliance in order to make a determination as to the conditions or events which caused the welding process parameter or parameters to be non-compliant. The system operator may also use the opportunity to make any necessary repairs to the welding device 12 or associated equipment. In this regard it should be noted that the method and apparatus according to the present invention may greatly assist the user in ascertaining the source of the defect. For example, since the apparatus 10 continuously monitors various welding process parameters during the entire welding process, it is a simple matter for the computer 26 to display the non-compliant process parameter or parameters on the display device 28. Knowledge of the non-compliant process parameter or parameters will, in most cases, allow the system operator to readily ascertain the nature of the problem and the appropriate solution.

The method or process 42 for assessing weld quality just described is performed by the computer 26 during the welding process in order to provide the operator with a real-time assessment of parameter compliance and/or weld quality. However, the parameter compliance and/or weld-quality assessment that is provided corresponds to a single weld. The statistical process control module 38 provides a means whereby the system operator may gather statistical data representative of a plurality of individual weld operations. The statistical data provided by the statistical process control module 38 allows the system operator to discover and track certain trends in the welding process.

Figure 4:
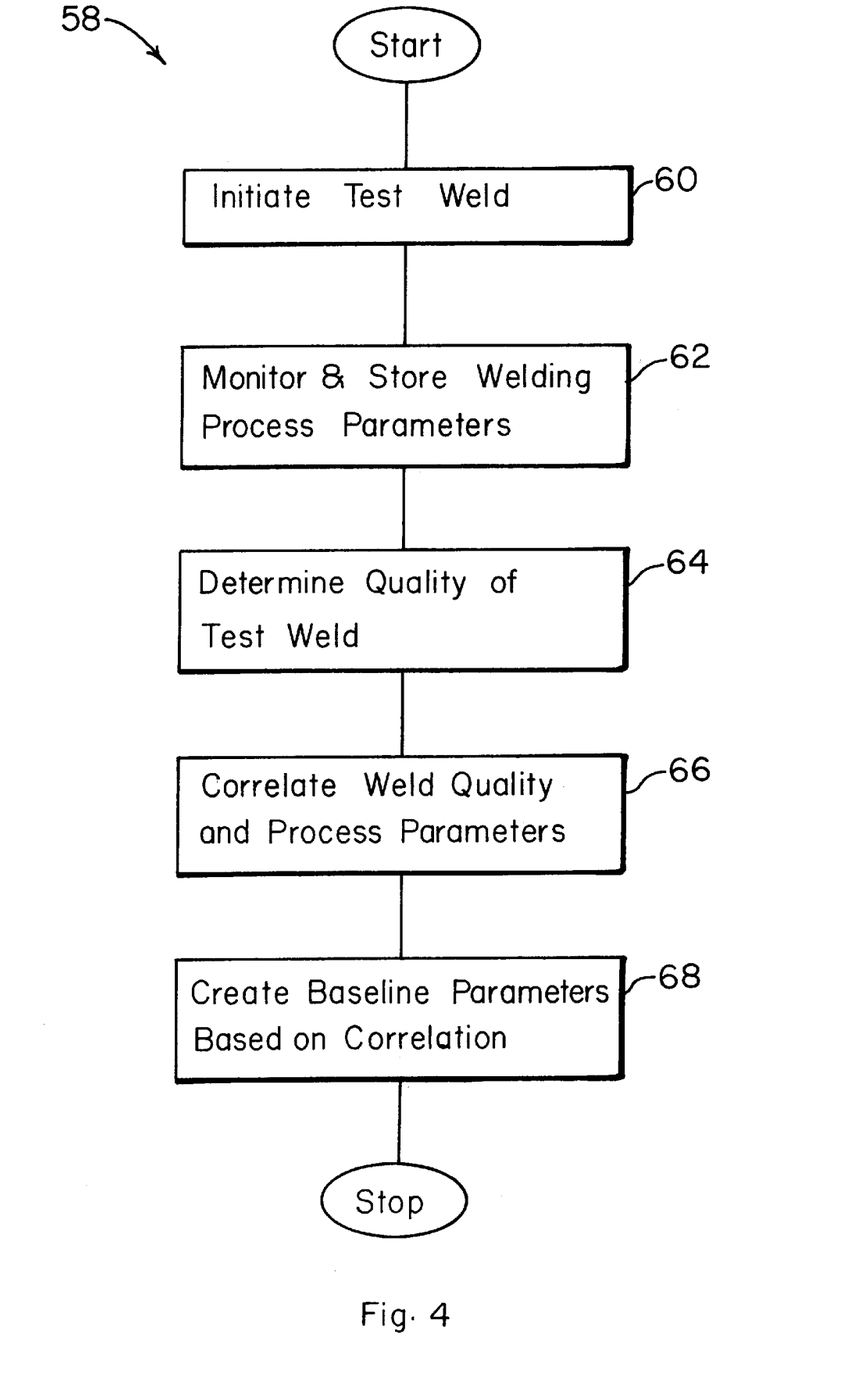
FIG. 4 is a flow diagram of a method for determining baseline parameters.

The selection of the appropriate baseline parameters as well as their preferred values or ranges of values is important in the successful operation of the present invention. For example, if the wrong baseline parameters are selected, or if their preferred values or ranges of values are incorrectly determined, then it will be difficult or impossible for the present invention to provide the system operator with an accurate assessment of parameter compliance and weld quality. In order to prevent such an occurrence, the present invention may be provided with a method 58 for determining baseline parameters. Alternatively, and as will be described in greater detail below, the baseline parameters may be determined from the statistical process data gathered by the statistical process control module 38.

With reference now to FIG. 4, the method 58 for determining baseline parameters may comprise a first step 60 of initiating a test weld. While the workpiece (not shown) is being welded, the apparatus 10 may monitor and store welding process parameters at step 60. Generally speaking, it is preferred, but not required, to monitor a large number of welding process parameters in order to ensure that the following correlation step (i.e., step 66) will properly correlate a given welding process parameter with a particular aspect of the weld. For example, depending on the particular welding process that is being performed, certain welding process parameters will have stronger (i.e., more direct) correlations on certain weld aspects or features than others. Consequently, monitoring and storing a large number of welding process parameters helps to separate those parameters that are strongly correlated with certain aspects or features of the weld from other parameters that may have little or no effect on those aspects or features of the weld.

After having monitored and stored the welding process parameters at step 62, the system operator (not shown) may remove the workpiece (not shown) from the welding device 12 (FIG. 1) and determine the quality of the test weld at step 64. As will be described in greater detail below, the quality of the test weld is usually best determined by utilizing any of a wide range of so-called "destructive" test methods well-known in the art. As the name implies, destructive test methods usually require that all or at least portions of the workpiece be destroyed in order to ascertain the quality of the weld. Alternatively, non-destructive testing methods do exist and may be suitable for providing an accurate assessment of weld quality in certain situations. In still another alternative arrangement, the quality of the weld may be determined from observations of the welding process itself. For example, in a constant voltage GMAW process, an assessment of weld quality may be made by observing the metal transfer mode during the welding operation itself. Such observations may be accomplished by high-speed videography.

In any event, and regardless of the particular test process (i.e., destructive, non-destructive, high-speed videography, etc.) that is used to ascertain the quality of the test weld, the system operator or welding engineer would then proceed to step 66 and correlate the quality of the weld with the welding process parameters monitored and stored at step 62. During this step 66, the system operator or welding engineer would examine the welding process parameters collected and stored by the apparatus 10 in order to correlate the stored welding process parameters with specific aspects or features of the test weld. From this correlation, one or more baseline parameters may be established at step 68. The baseline parameters may then be stored in the computer 26 so that they may be used to provide the system operator with a real-time assessment of weld quality in the manner already described. For example, if the test weld was created using a constant voltage GMAW process, the process 66 will correlate the particular metal transfer mode (as observed via high-speed videography) with the monitored welding parameters. Thereafter, in subsequent welding operations, an assessment of welding parameter compliance will allow the system 10 to provide the system operator with an indication of the metal transfer mode for that particular weld.

Generally speaking, the greater the number of test welds, the more accurate and reliable will be the correlation of the welding process parameters with certain aspects or features of the weld. Consequently, the present invention should not be regarded as limited to any particular number of test welds. Regardless of the number of test welds that are performed, each set of welding process parameters are marked or "tagged" with the corresponding test weld. Such marking allows the system operator or welding engineer to match the collected welding process parameters with the corresponding test weld.

A significant advantage of the method and apparatus for determining weld quality according to the present invention is that it provides the system operator with a real-time assessment of welding process parameter compliance and/or weld quality. If the welding process parameter or parameters are determined to be non-compliant, or if the weld quality is determined to be poor, the part may be rejected or repaired immediately. Alternatively, the part may be removed for further inspection in order to determine whether the weld is of adequate quality. Moreover, since the system 10 provides the system operator with a real-time indication of parameter compliance, the system operator may more readily determine the cause of the non-compliance, thus ensure that the process and equipment continues to be operated in a manner that will produce compliant parameters and good quality welds. That is, since the present invention provides the system operator with an indication of the specific process parameter or parameters that were not in compliance with specifications, the invention, over time, provides the system operator with an ever-increasing understanding of the overall weld operation and which types of parameters will lead to certain types of defects.

Having briefly described the method and apparatus for determining weld quality according to the present invention, as well as some of its more significant features and advantages, the various preferred embodiments of the method and apparatus for determining weld quality will now be described in detail. However, before proceeding with the description, it should be noted that the method and apparatus for determining weld quality is shown and described herein as it may be used to determine the quality of a weld produced by either a gas metal arc welding process (GMAW) or by a gas tungsten arc welding process (GTAW). However, the method and apparatus for determining weld quality according to the present invention may be used with any of a wide range of other welding devices and processes now known in the art or that may be developed in the future, as would be obvious to persons having ordinary skill in the art after having become familiar with the teachings of the present invention. Consequently, the present invention should not be regarded as limited to the specific types of welding devices and processes shown and described herein.

With the foregoing considerations in mind, one embodiment of an apparatus 10 for determining the quality of a weld is shown in FIG. 1 and may comprise a plurality of hardware and software components for monitoring one or more welding process parameters in real-time and for producing output data 40 that are indicative of the quality of the weld (not shown) produced by a welding device 12. The hardware components may comprise a plurality of probes or transducers (e.g., 16, 18, and 20) for monitoring the operation of the welding device 12, a signal processing circuit 14, a converter circuit 22, and a computer 26 which, in the embodiment shown and described herein, may be provided with a display device 28, such as a CRT or LCD display panel. The software components are illustrated in FIG. 2 and may comprise a plurality of algorithms and modules (e.g., 32, 34, 36, and 38) that are used by the computer 26 to process the input data 30 derived from the various probes and transducers to produce output data 40 that are indicative of the quality of the weld produced by the welding device 12. The various hardware components will be described first, followed by the various software components.

Still referring to FIG. 1, the welding device 12 may comprise any of a wide range of arc-type welding devices now known in the art or that may be developed in the future for performing any of a wide range of arc-type welding processes. For example, the welding device 12 may comprise a gas metal arc welder (GMAW) having a pair of electrodes (schematically illustrated in FIG. 1 at 70 and 72) which may be used to form a weld (not shown) on a workpiece or part (also not shown). A metal feed wire 74 (FIGS. 1 and 5) may serve as one of the electrodes (e.g., 70 or 72) of the GMAW welding device 12. As will be described in greater detail below, the wire feed rate of the metal feed wire 74 may be an important welding process parameter in such MAW welding processes.

In the embodiment shown and described herein, the GMAW welding device 12 may be operated in either a constant voltage mode or a pulsed current mode. If the GMAW welding device 12 is operated in the constant voltage mode, a power supply (not shown) associated with the welding device 12 supplies a substantially constant voltage to the electrodes 70 and 72. Alternatively, if the GMAW welding device 12 is operated in the pulsed current mode, the power supply (not shown) provides an intermittent or pulsed current (typically a square wave) to the electrodes 70 and 72. The particular operational mode (i.e., constant voltage or pulsed current) used by the welding device 12 depends on the type of material being welded and on other extrinsic factors. However, since the selection of the particular operational mode would be obvious to persons having ordinary skill in the art after considering the teachings of the present invention and the particular application, the various operational modes of the GMAW welding device 12 will not be described in further detail herein.

In yet another application, the present invention maybe utilized in "spot-welding" type processes. Such processes may employ a gas tungsten arc welding (GTAW) device 12. Such gas tungsten arc welding (GTAW) devices are similar to the GMAW arc welding device described above and may comprise a pair of electrodes 70 and 72 which are used to weld the workpiece (not shown). However, the GTAW welder utilized in one preferred embodiment of the present invention differs from the GMAW welder described above in that the GTAW welder does not utilize a metal feed wire.

Referring back now to FIG. 1, and in accordance with its use with either GMAW or GTAW welding devices and processes, the apparatus 10 for determining weld quality may be provided with a plurality of probes and transducers suitable for monitoring the operation of the welding device 12. More specifically, the apparatus 10 may be provided with a voltage probe 16 suitable for being connected to the welding device 12 so that the probe 16 detects the voltage drop across the electrodes 70 and 72. The voltage probe 16 thereafter produces an output signal that is representative of the voltage drop across the electrodes 70 and 72.

The voltage probe 16 may comprise any of a wide range of voltage probes suitable for the intended application and that are well-known in the art and readily commercially available. Accordingly, the present invention should not be regarded as limited to any particular type or style of voltage probe. However, by way of example, in one preferred embodiment, the voltage probe 16 may comprise a pair of insulated battery-style clips (e.g., a negative clip 94 and a positive clip 96) that are connected to the signal processor 14 by suitable conductors 92, such as insulated wire. The negative clip 94 may be connected to a suitable ground node (not shown) associated with the welding device 12, preferably at a point close to the workpiece. It is generally preferred, but not required, that the positive clip 96 be attached to the positive electrode (e.g., 70 or 72) at a point as close as possible to the contact tip of the electrode in order to reduce noise and produce an output signal that more closely represents the actual voltage drop across the weld arc. For example, the positive clip 96 may be connected to the power cable (not shown) that is attached to the positive electrode (e.g., 70 or 72). Alternatively, the positive clip 96 may be attached to the power cable (not shown) that is connected to the wire feed assembly (also not shown) associated with the welder 12 for feeding the feed wire 74 to the welder 12. Clips 94 and 96 of the type described above are available from Newark Electronics Company of Knoxville, Tenn. as battery clip part nos. 46F3812 (red) and 46F3811 (black).

It should be noted that the foregoing arrangement of the clips 94 and 96 of the voltage probe 16 is suitable for the GMAW type welding process. If a GTAW process is used, it would be necessary to reverse the connection points of the clips 94 and 96 since the polarity of the welder electrodes is reversed in most GTAW processes.

A current transducer 18 may also be provided which is suitable for measuring the current delivered to the electrodes 70,72 of welding device 12. It is generally preferred, but not required, that the current transducer comprise a Hall-effect type transducer of the type that is well-known in the art and readily commercially available. A Hall-effect transducer is capable of sensing a current flowing through a wire based on the strength of the magnetic field produced by the current in the wire. Consequently, such a Hall-effect transducer need not be electrically connected to the wire, thereby allowing the transducer to be readily connected to and disconnected from the welding device 12. In the embodiment shown and described herein, the current transducer 18 may comprise current transducer part no. CTL-1000TS Y05 and associated signal conditioner, part no. CTA-201, available from Ohio Sernitronics Company. Alternatively, other types of current sensing devices maybe used, as would be obvious to person shaving ordinary skill in the art after having become familiar with the teachings of the present invention.

If the present invention is to be used with GMAW type welders, then it is preferred that the invention also be provided with a wire feed transducer 20 suitable for producing an output data signal indicative of the wire feed speed of the metal feed wire 74. Any of a wide variety of sensors or transducers that are well-known in the art or that may be developed in the future may be used to sense the feed speed of the metal feed wire 74. Consequently, the present invention should not be regarded as limited to any particular type of sensor or transducer. However, by way of example, in one preferred embodiment, the wire feed transducer 20 may comprise the wire feed transducer 20 of the type shown in FIG. 5.

Figure 5:
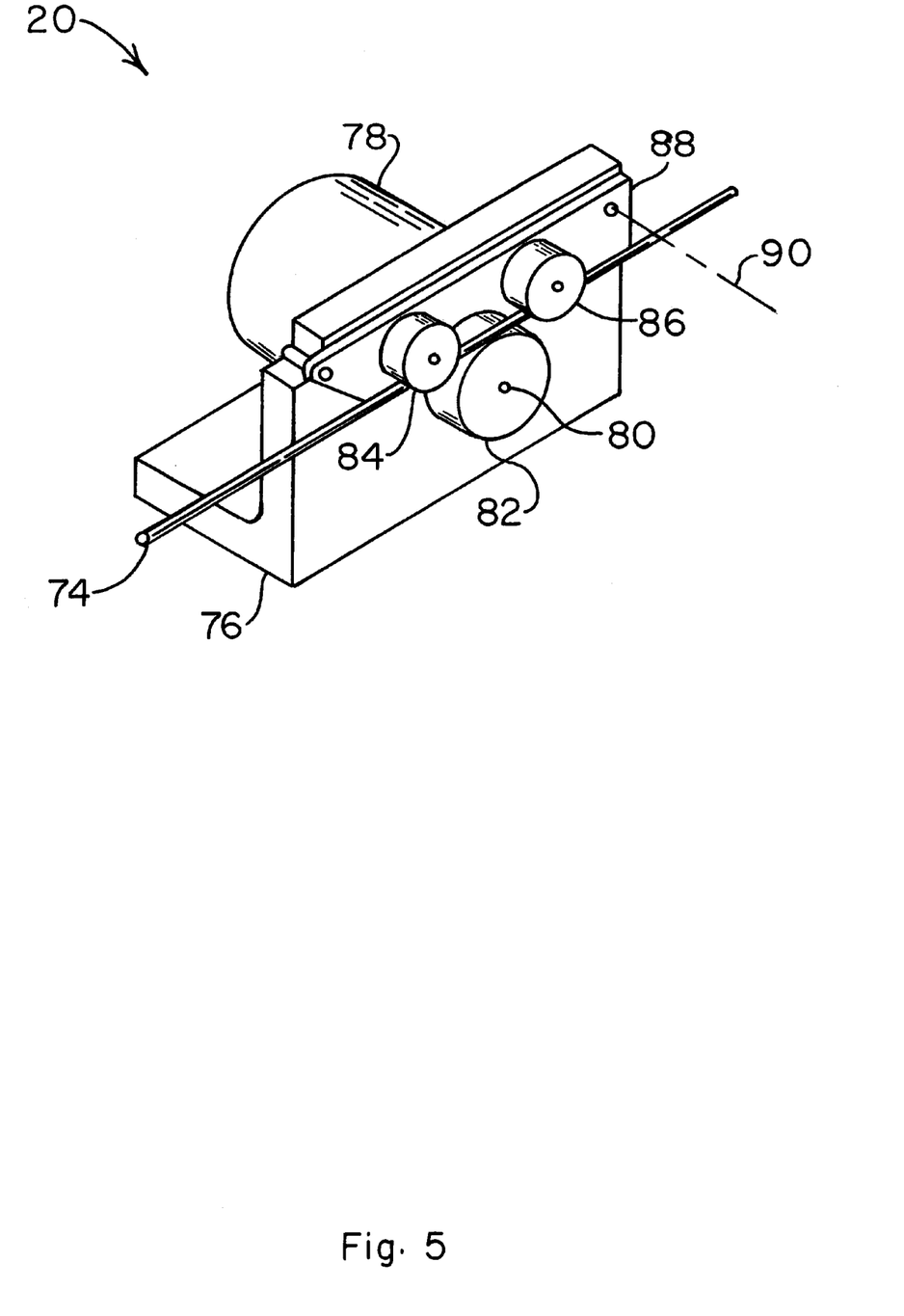
FIG. 5 is a perspective view of a wire feed transducer that may be utilized in one embodiment of the invention.

Referring now to FIG. 5, the wire feed transducer 20 that may be utilized in one preferred embodiment of the present invention may comprise a bracket or plate 76 to which may be mounted an optical encoder 78. The optical encoder 78 produces a square wave output signal (not shown) indicative of the angular rotation of the input shaft 80 of optical encoder 78. A friction wheel 82 mounted to the input shaft 80 of encoder 78 engages the metal feed wire 74 so that the feed wire 74 turns the friction wheel 82 as the feed wire 74 is drawn into the welder 12 (not shown in FIG. 5, but shown schematically in FIG. 1). The transducer 20 may also be provided with a pair of idler wheels 84 and 86 mounted to a pivot plate 88. Pivot plate 88 may be pivotally mounted to the bracket 76 so that the pivot plate 88 may be rotated about a pivot axis 90 to allow the idler wheels 84 and 86 to urge the feed wire 74 against the friction wheel 82. A spring (not shown) may be used to apply additional pressure to the pivot plate 88, thereby further ensuring anon-slipping engagement of the feed wire 74 with the friction wheel 82. In accordance with the foregoing arrangement, the feed wire 74 turns the friction wheel 82 as the feed wire is fed into the welding device 12 (FIG. 1). The rotating friction wheel 82 causes the optical encoder 78 to produce a square wave output signal having a frequency that is proportional to the speed of the feed wire 74.

In the embodiment shown and described herein, the optical encoder 78 may be provided with a conversion circuit (not shown) for converting the frequency of the square wave output of the optical encoder 78 to a voltage that is directly proportional to the frequency of the square wave, thus the speed of the metal feed wire 74. However, since conversion circuits for converting the frequency of a square wave signal to a voltage that is proportional to the frequency of the square wave signal are known in the art and could be readily provided by persons having ordinary skill in the art, the particular conversion circuit that is utilized in one preferred embodiment of the present invention will not be shown and described in further detail herein. However, by way of example, in one preferred embodiment, the conversion circuit may be built around a type LM2907-N8 integrated circuit "chip" available from Digi-Key Corporation of Thief River Falls, Minn.

Referring back now to FIG. 1, each probe or transducer 16, 18, and 20 may be connected to a signal processor 14. In the embodiment shown and described herein, the signal processor 14 performs three functions: 1) Filtering the acquired signals; 2) conditioning the signal so that the full-scale range of the incoming analog signal corresponds to the full-scale range of the analog to digital converter 22; and 3) signal isolation. Specific apparatus associated with the signal processor 14 for performing the foregoing functions will now be described.

With regard to the filtering function, the signal processor 14 may be provided with a low-pass filter for each probe or transducer that is connected thereto. Since the data signals that are produced by the probes and transducers are ultimately converted into digital input signals 30 by the analog-to-digital converter 22, the low pass filters associated with the signal processor 14 should be selected to remove noise and other spurious signals having frequencies in excess of about one-half the sampling rate of the converter 22. Removing from the data signals produced by the probes and transducers frequencies higher than about one-half the sampling rate of the converter reduces errors due to aliasing. In the embodiment shown and described herein, both the sample rate of the converter 22 and the cut-off frequencies of the filters are variable (i.e., user selectable). Accordingly, it is important that the user select an appropriate filter/sampling rate combination to avoid aliasing. As a rule, the sample rate should be about twice the filter cut-off frequency. For example, if the sampling rate is set to 5000 samples per second, then the filter cut-off frequency should be set at about 2.5 kHz. Similarly, a sampling rate of 100,000 samples per second should be used with a filter cut-off frequency of about 50 kHz. The coordination of the sampling rate and cut-off frequency may be accomplished either manually (i.e., user-selectable) or may be automatic.

Since such variable cut-off low pass filters are well-known in the art and could be easily provided by persons having ordinary skill in the art after having become familiar with the teachings of the present invention, and since the details of such filters are not necessary for the understanding of the present invention, the particular low pass filters utilized in one embodiment of the present invention will not be discussed in further detail herein. However, by way of example, the variable cut-off low pass filter utilized in one preferred embodiment of the present invention may comprise apart no. MAX292CPA filter available from Digi-Key Corporation.

The second function provided by the signal processor 14 is to condition the signals from the transducers and probes (e.g., 16, 18, and 20) so that the full-scale range of the incoming voltage signals from the probes and transducers corresponds to the full-scale range of the analog to digital converter 22. Such an arrangement maximizes the resolution of the system. For example, in the embodiment shown and described herein, each of the probes and transducers (e.g., 16, 18, and 20) produces an output signal that ranges from about 0 volts to about 10 volts. While the particular converter 22 utilized in one preferred embodiment has user-selectable ranges for the input signal, the ranges are spread out on either side of zero volts. For example, the converter 22 may have an input signal range of ±5 volts or ±10 volts. In order to maximize the resolution of the resulting digital data 30 produced by the converter 22, the signal processor 14 converts the 0–10 volt output signals from the transducers and probes to voltages that range from ±5 volts. So conditioning the probe signals effectively doubles the signal resolution that would otherwise be possible with this specific combination of probes 16, 18, 20 and converter 22.

Since electronic circuitry and devices to accomplish such signal conditioning (e.g., converting a 0–10 volt signal into a ±5 volt signal) are well-known in the art and could be easily provided by persons having ordinary skill in the art, the particular electronic circuitry and devices utilized by the signal processor 14 to convert the probe and transducer output signals from 0–10 volt signals to ±5 volt signals will not be described in further detail herein.

The last function provided by the signal processor 14 is that of signal isolation. More specifically, a plurality of optical isolators (not shown) may be provided in order to prevent voltage spikes from being transmitted to the converter 22 and computer 26. Here again, since such optical isolation circuitry is well-known in the art and could be easily provided by persons having ordinary skill in the art after having become familiar with the teachings of the present invention, the particular optical isolators that may be utilized in one preferred embodiment of the present invention will not be described in further detail herein. However, by way of example, in the embodiment shown and described herein, the signal processor 14 may be provided with optical isolators available from Analog Devices, Inc., as part no. AD215BY. Alternatively of course, other types of isolators now known in the art or that may be developed in the future could also be used.

The converter 22 may comprise an analog to digital converter suitable for converting the analog signals 24 from the signal processor 14 into digital input data signals 30 which are suitable for processing by the computer 26. While any of a wide range of analog to digital converters that are well-known in the art and readily commercially available maybe used for the converter 22, the converter 22 utilized in one preferred embodiment of the present invention may comprise a DAQCard-700, part no. 776985-01, available from National Instruments of Atlanta, Ga.

The computer 26 may comprise any of a wide range of computer systems and devices, such as general purpose programmable computers, that are also well-known in the art and readily commercially available. Consequently, the present invention should not be regarded as limited to any particular type or style of computer system. However, by way of example, in one preferred embodiment, the computer 26 and display system 28 may comprise any of a wide range of "notebook" type of personal computers, such as a "Think Pad" 770 notebook type of personal computer available from International Business Machines (IBM) or a "Latitude CP" notebook type personal computer available from Dell Computers.

It is generally preferred, but not required, that the various software components of the invention be written in a scientific programming language available from National Instruments, entitled LabVIEW, version 5.0., part no. 776670-03. Alternatively, other types of programming languages now known in the art or that may be developed in the future may also be used, as would be obvious to persons having ordinary skill in the art after having become familiar with the teachings of the present invention.

With reference now to FIG. 2, the computer 26 processes the digital input data 30 produced by the converter 22 according to various ones of several different algorithms and modules in order to produce output data 40 that are indicative of the quality of the weld produced by the welding device 12 (FIG. 1). More specifically, in the embodiment shown and described herein, the computer 26 may access a constant voltage algorithm 32, a short duration algorithm 34, a pulsed current analysis module 36, and a statistical process control module 38. As mentioned above, the particular algorithm or module (e.g., 32, 34, 36, and 38) that is selected by the computer 26 depends on the particular type of welding process that is to be performed by the welding device 12. The selection also depends on whether the system operator desires to accumulate statistical data relating to a plurality of individual welding operations. In the embodiment shown and described herein, the particular type of welding process that is to be performed governs the selection of algorithms or modules 32, 34, and 36, whereas the system operator governs the selection of the statistical process control module 38.

Regardless of the particular software component (i.e., algorithm or module 32, 34, 36, or 38) that is selected to process the input data 30, the method or process 42 that is used to determine the weld quality is best seen in FIG. 3. The first step 44 in the process 42 is to determine the particular welding process that is to be performed by the welding device 12. As mentioned above, the determination of the particular welding process drives the decision as to whether the input data 30 are processed by the constant voltage algorithm 32, the short duration weld algorithm 34, or the pulsed current analysis module 36. For example, if the welding device 12 comprises a gas metal arc welder (GMAW) that may be operated in either the constant voltage mode or the pulsed current mode, the computer 26 accesses either the constant voltage algorithm 32 or the pulsed current analysis module 36, as the case may be. Alternatively, if the welding device 12 comprises a gas tungsten arc welder (GTAW) configured for "spot welding" processes, the computer 26 may process the digital input data 30 according to the short duration weld algorithm 34. The computer 26 may also access the statistical process control module 38 if the system operator so desires. The statistical process control module 38 provides the system operator with statistical data compiled over a multiplicity of welds.

As will be described in greater detail below, the statistical data provided by the statistical process control module 38 may be used by the system operator to discover and track certain trends in the welding process. It should be noted that the statistical process control module 38 may be available for use with only one, some, or all of the algorithms or modules 32, 34, and 36, depending on the particular application. Put in other words, the statistical process control module 38 need only be made available for those welding processes for which the system operator might desire to collect statistical data. Consequently, the present invention should not be regarded as limited to to any particular configuration of statistical process control module availability. However, by way of example, in the embodiment shown and described herein, the statistical process control module 38 is available when using either the constant voltage algorithm 32 or the pulsed current analysis module 36. The statistical process control module 38 is not available with the short duration weld algorithm 34. Alternatively, the statistical process control module 38 could be made available for use with the short duration weld algorithm 34 if so desired. Such a modification could be accomplished by making the appropriate changes to the functionality of the statistical process control module 38 as would be obvious to persons having ordinary skill in the art after having become familiar with the teachings of the present invention.

After the particular weld process has been determined at step 44, the process 42 may proceed to step 46 which selects the appropriate algorithm or module for the particular weld process that is being performed by the welding device 12. As was mentioned above, if the welding device 12 is to perform constant voltage gas metal arc welding (GMAW), then the computer 26 will select the constant voltage algorithm 32 and will thereafter process the digital input data 30 according to the constant voltage algorithm 32. If, on the other hand, the welding device 12 is to perform pulsed current GMAW, then the computer 26 will process the digital input data 30 according to the pulsed current analysis module 36. Similarly, the digital input data 30 will be processed according to the short duration weld algorithm 34 if the welding device 12 is to be used to perform gas tungsten arc "spot" welding (GTAW). In any event, once the appropriate algorithm or module has been selected, the method 42 may proceed to step 48. In this step 48, the welding process is initiated and is thereafter detected by the apparatus 10 according to the present invention. The apparatus 10 monitors at least one welding process parameter associated with the particular welding process that is being performed by the welding device 12.

The welding process parameter or parameters that may be monitored by the apparatus 10 include, but are not limited to, voltage, current, and wire feed speed. The foregoing parameters may be detected by the voltage probe 16, current probe 18, and wire feed speed transducer 20 (FIG. 1), respectively. Before proceeding with the description, it should be noted that certain "derived welding process parameters" may be determined from the voltage, current, and wire feed speed parameters that are sensed by the respective probes and transducers. Such "derived welding process parameters" nevertheless should be regarded as "welding process parameters" and may be used by the various algorithms and modules 32, 34, 36, and 38. That is to say, the term "welding process parameters" as used herein specifically includes both "monitored" and "derived" welding process parameters.

The welding process parameter or parameters are monitored "on-the-fly" (i.e., in real time) and are compared with a baseline parameter or parameters at step 50 depending on the particular algorithm or module that is being used. For example, in the embodiment shown and described herein, the monitored welding process parameters are compared with corresponding baseline parameters in the constant voltage algorithm 32, the short duration weld algorithm 34, and the statistical process control module 38. In contrast, this comparison process 50 is not performed by the pulsed current analysis module 36. However, in an alternative arrangement the comparison process 50 may be performed by the pulsed current analysis module 36 if so desired. In yet another alternative arrangement, the comparison process 50 may be performed for any individual algorithm or module, or any combination of algorithms or modules, again depending on the particular application and desired functionality. Consequently, the present invention should not be regarded as limited to performing the comparison process 50 for any particular module or combinations of modules.

As mentioned above, the particular welding process parameters that are monitored are specific to the particular welding process that is being used. Similarly, the particular methodology that is used to compare the welding process parameters with the baseline parameters and to produce the output data 40 indicative of weld quality is specific to the particular algorithm or module that is being used. Moreover, and as noted above, the step 50 of comparing the monitored welding process parameters with the baseline parameters is only performed by the constant voltage algorithm 32, the short duration weld algorithm 34, and the statistical process control module 38. However, as also noted above, other embodiments of the invention may perform this step 50 for all modules if so desired.

If the welding parameters being monitored are compliant with the baseline parameters, as determined at step 52, the computer 26 will produce output data 40 (FIG. 2) that are indicative of the compliance. Alternatively, the computer 26 may produce output data 40 that are more directly indicative of a successful or good quality weld. For example, and as will be described in greater detail below, the short duration weld algorithm 34 produces an indication of weld quality based on the compliance or non-compliance of welding parameters. In any event, such indications (e.g., of parameter compliance or weld quality) may be presented via the display device 28 (FIG. 1) at step 54. At this point, the successfully welded workpiece (not shown) may be removed from the welding device 12 and another inserted in its place. The welding and monitoring processes may then be repeated beginning with step 48, as best seen in FIG. 3.

If, on the other hand, the computer 26 determines at step 52 that the welding parameters are not compliant with the baseline parameters, the process 42 will proceed to step 56 and indicate parameter non-compliance and/or that the weld may be suspect and/or likely to be defective. Again, such an indication may be presented to the user via the display device 28 associated with the computer 26. At this point, it will usually be desirable to stop the welding process so that the system operator (not shown) can make a determination as to the conditions or events that caused the parameters to be non-compliant. The system operator may also use the opportunity to make any necessary repairs to the welding device 12 or associated equipment. In this regard it should be noted that the method and apparatus according to the present invention may greatly assist the user in ascertaining the source of the defect. For example, and as will be described in greater detail below, the computer 26 may display the non-compliant process parameter or parameters on the display device 28. Knowledge of the non-compliant process parameter or parameters will, in most cases, allow the system operator to readily ascertain the nature of the problem and the appropriate solution.

The selection of the appropriate baseline parameters as well as their preferred values or ranges of values is important in the successful operation of the present invention. That is, if the wrong baseline parameters are selected, or if their preferred values or ranges of values are incorrectly determined, then it will be difficult or impossible for the present invention to provide the system operator with an accurate assessment of parameter compliance from which weld quality may be determined. In order to prevent such an occurrence, the present invention may be provided with a method 58 for determining baseline parameters. Alternatively, and as will be described in greater detail below, the baseline parameters may be established based on user-selected values or based on the statistical data collected by the statistical process control module 38.

Referring now to FIG. 4, the method 58 for determining baseline parameters may comprise a first step 60 of initiating a test weld. While the workpiece (not shown) is being welded, the apparatus 10 detects the initiation of the welding process and monitors and stores the welding process parameters at step 60. In the embodiment shown and described herein, the particular welding process parameters that are monitored and/or stored are user-selectable. That is, the user may instruct the computer 26 to monitor nearly any desired weld parameter, provided, of course, that the desired weld parameter may be obtained from the data produced by the various sensors and transducers 16, 18, 20 (FIG. 1). Such user-selectable functionality may be provided by means of the appropriate program menus, icons, fields, etc., suitable for allowing a user to make such selections. However, since techniques for providing such functionality in computer software are well-known in the art, the particular techniques utilized in one preferred embodiment of the present invention will not be described in further detail herein.

With regard to the selection of welding parameters, it is generally preferred, but not required, to monitor a large number of welding process parameters in order to ensure that the following correlation step (i.e., step 66) will properly correlate a given welding process parameter with a particular aspect of the weld. For example, certain welding process parameters will have stronger (i.e., more direct) correlations on certain weld aspects or features than others. Consequently, monitoring and storing a large number of welding process parameters helps to separate those parameters that are strongly correlated with certain aspects or features of the weld from other parameters that may have little or no correlation with those aspects or features of the weld.

After having monitored and stored the welding process parameters at step 62, the system operator (not shown) may remove the workpiece (not shown) from the welding device 12 (FIG. 1) and determine the quality of the test weld at step 64. As mentioned above, the quality of the test weld may be ascertained by utilizing any of a wide range of "destructive" test methods well-known in the art. Alternatively, a wide variety of non-destructive testing methods do exist and may be suitable for providing an accurate assessment of weld quality, depending on the particular application.

Regardless of the particular test process (i.e., destructive or non-destructive) that is used to ascertain the quality of the test weld, the system operator or welding engineer would then proceed to step 66 and correlate the quality of the test weld with the welding process parameters monitored and stored at step 62. During this step 66 the system operator or welding engineer would examine the welding process parameters collected and stored by the apparatus 10 in order to correlate the stored welding process parameters with specific aspects or features of the test weld. From this correlation, one or more baseline parameters may be established at step 68. The baseline parameters may then be stored in the computer 26 so that they may be used to provide the system operator with a real-time assessment of weld quality in the manner already described.

Generally speaking, it will be desirable to produce a relatively large number of test welds in order to provide a more accurate and reliable correlation of welding process parameters with certain aspects or features of the weld. That is, the greater the number of test welds, the more accurate and reliable the correlation. In this regard it should be noted that certain welding processes may achieve a certain accuracy with only a relatively small number of test welds while other welding processes may require a significantly greater number of test welds before the same correlation accuracy can be achieved. Accordingly, the present invention should not be regarded as limited to requiring any particular number of test welds. Regardless of the actual number of test welds performed, each set of welding process parameters should be marked or "tagged" with the corresponding weld, thereby allowing the system operator or welding engineer to match the collected welding process parameters with the corresponding test weld.

Having described the general method for assessing weld quality 42 as well as the general method for determining baseline parameters 58, the methods 42 and 58 will now be described as they may be implemented according to the specific algorithms and modules 32, 34, 36, and 38 that may be utilized in one preferred embodiment of the present invention.

The constant voltage algorithm 32 is utilized if the welding device 12 is to perform a constant voltage gas metal arc welding (GMAW) process. The characteristics of the constant voltage GMAW process (and the resulting weld quality) may be described in terms of the size and frequency of metal droplets that are transferred from the electrode (e.g., 70, 72) to the workpiece (not shown). This "metal transfer mode" is known to affect weld deposition rate, penetration, and spatter. The metal transfer mode is also an important factor in out-of-position welding and its effect on weld penetration makes it an important consideration in thin section welding where burn-through is a concern. Since the metal transfer mode is highly correlated with weld quality, a determination of the metal transfer mode generally provides a good indication of weld quality. The metal transfer mode may be determined by observing the welding process during the welding of a test piece. While any of a wide range of devices and methods may be used to observe the welding process, thus determine the metal transfer mode, in the embodiment shown and described herein, high-speed videography is used to determine the metal transfer mode for a test weld.

The metal transfer mode in a constant voltage GMAW process may be determined from the current and voltage signatures of the weld process. More specifically, in one preferred embodiment of the present invention, the constant voltage algorithm monitors the voltage and current of the welding device 12 in order to determine the following welding process parameters: Average current ($I_{avg}$), minimum current ($I_{min}$), the standard deviation of current ($I_{sd}$), and the standard deviation of voltage ($V_{sd}$). The constant voltage algorithm 32 then performs a "fuzzy logic" comparison of the foregoing welding process parameters in order to determine the metal transfer mode, thus weld quality.

The fuzzy logic rules and membership functions on which the constant voltage algorithm is based are as follows:
Fuzzy logic rules:

If $I_{sd}$ is low, then metal transfer mode is spray;

If $I_{sd}$ is high AND $V_{sd}$ is high AND $I_{min}$ is high, then metal transfer mode is globular;

If $I_{sd}$ is high AND $V_{sd}$ is high and $I_{min}$ is low AND $I_{avg}$ is low, then metal transfer mode is short circuiting;

If $I_{sd}$ is high AND $I_{min}$ is low AND $I_{avg}$ is high, then metal transfer mode is shorting streaming.

The fuzzy logic membership functions are as follows:

$I_{avg}$:

| | | |
|---|---|---|
| Low ($I_{avg}$) | 1 | $I_{avg} < 50$ |
| | $=2.5 - I_{avg}/100$ | $150 < I_{avg} < 250$ |
| | 0 | $250 < I_{avg}$ |
| High ($I_{avg}$) | 0 | $I_{avg} < 150$ |
| | $=-1.5 + I_{avg}/100$ | $150 < I_{avg} < 250$ |
| | 1 | $250 < I_{avg}$ |

$I_{sd}$:

| | | |
|---|---|---|
| Low ($I_{sd}$) | 1 | $I_{sd} < 10$ |
| | $=2 - I_{sd}/10$ | $10 < I_{sd} < 20$ |
| | 0 | $20 < I_{sd}$ |
| High ($I_{sd}$) | 0 | $I_{sd} < 10$ |
| | $=-1 + I_{sd}/10$ | $10 < I_{sd} < 20$ |
| | 1 | $20 < I_{sd}$ |

$V_{sd}$:

| | | |
|---|---|---|
| Low ($V_{sd}$) | 1 | $V_{sd} < 0.5$ |
| | $=1.25 - V_{sd}/2$ | $0.5 < V_{sd} < 2.5$ |
| | 0 | $2.5 < V_{sd}$ |
| High ($V_{sd}$) | 0 | $V_{sd} < 0.5$ |
| | $=-0.25 + V_{sd}/2$ | $0.5 < V_{sd} < 2.5$ |
| | 1 | $2.5 < V_{sd}$ |

$I_{min}$:

-continued

| | | |
|---|---|---|
| Low ($I_{min}$) | 1 | $I_{min} < 50$ |
| | $=2 - I_{min}/50$ | $50 < I_{min} < 100$ |
| | 0 | $100 < I_{min}$ |
| High ($I_{min}$) | 0 | $I_{min} < 50$ |
| | $=-1 + I_{min}/50$ | $50 < I_{min} < 100$ |
| | 1 | $100 < I_{min}$ |

The various numerical values for the average current ($I_{avg}$), minimum current ($I_{min}$), the standard deviation of current ($I_{sd}$), and the standard deviation of voltage ($V_{sd}$) presented in the right-hand columns of the foregoing tables may be determined from the results of the high-speed videography observations which may be applied in accordance with the method for determining baseline parameters 58 described above and illustrated in FIG. 4. That is, the numerical values represent the baseline parameter ranges for each corresponding welding process parameter. Alternatively, the numerical values for the baseline parameters may be user-selected or may be determined based on statistical data collected by the statistical process control module 38 in the manner that will be described in greater detail below.

Regardless of the particular method or process that is used to determine the baseline parameter ranges, it should be remembered that the baseline parameter ranges set forth in the foregoing tables are specific to the particular constant voltage GMAW process being performed. Other applications or welding devices may or may not utilize the same baseline ranges as those specified above in the tables. Consequently, the present invention should not be regarded as limited to the specific baseline parameter ranges shown and described herein.

After the metal transfer mode has been determined, the computer 26 will display the metal transfer mode for the system operator on the display device 28. At this point, the computer 26 may be programmed to allow the system operator to access more detailed information about the weld. For example, upon "clicking" on a "help" icon, the computer 26 may be programmed to display more detailed information describing the characteristics of the weld produced by the particular metal transfer mode as well as the conditions that cause it. The "help" window may provide hypertext links to more information, including suggestions for improving the weld.

If the system operator chooses help in improving the weld, the computer 26 may be programmed so that a different help window will pop-up that suggests parameter changes that will move the process into the appropriate metal transfer mode. Such suggestions or recommendations may be based on an empirically determined relationship between metal transfer mode and weld quality. For example, the "spray" metal transfer mode is characterized by consistency, good penetration, and a low degree of spatter and is therefore assumed to be the standard of weld quality for constant voltage gas metal arc welding (GMAW) processes. It should be noted, however, that the spray metal transfer mode is not ideal for every application. For example, the short-arc metal transfer mode is often preferred for welding thin sections due to the lower current levels associated with the process. In addition, spray metal transfer mode may not be achievable with higher concentrations of $CO_2$ in the shielding gas.

In the embodiment shown and described herein, the foregoing display functions and options are provided by means of programming the LabVIEW software contained on the computer 26 to display the appropriate data and icons. However, since the foregoing display functions and options may be easily provided on the LabVIEW software by persons having ordinary skill in the art after having become familiar with the teachings of the present invention, and since the programming steps and methods required to produce such display functions and options are not required to understand or practice the present invention, the particular programming steps and methods utilized in one preferred embodiment of the present invention to provide such display functions and options via the LabVIEW software will not be described in further detail herein.

The short duration weld algorithm 34 is utilized in short duration GTAW spot welding processes. Generally speaking, the quality of the weld produced by a short duration GTAW spot welding process is related to the energy applied to the workpiece. Accordingly, the short duration weld algorithm 34 determines weld quality based on the input power provided to the workpiece (not shown), the stability of the arc initiation process, the stability of the overall welding process, and the nature and extent of any electrical transients.

Figure 6A:
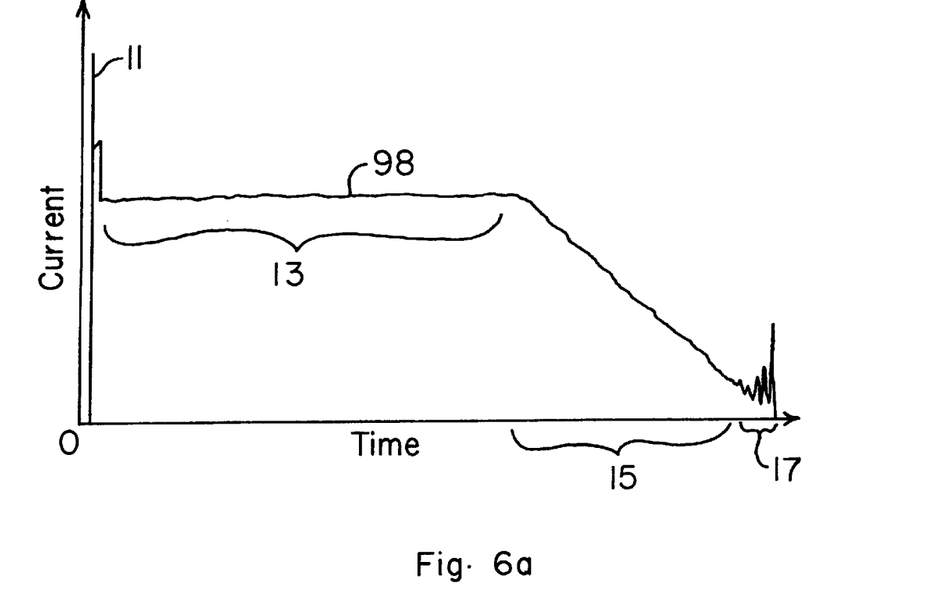
FIG. 6(a) is a plot of current vs. time for an "optimal" short duration spot weld operation.

The short duration weld algorithm 34 is best understood by first considering two different types of current waveforms that may be produced by the welding device 12. A first or "optimal" current waveform 98 is shown in FIG. 6(*a*) and typically results in a high quality spot weld. The optimal current waveform 98 may include an initial current spike region 11 which indicates the initiation of the arc. After the arc is established, the current then drops down to substantially constant level, referred to herein as a plateau region 13. As the termination point of the spot welding process draws near, the power supply (not shown) associated with the welding device 12 gradually ramps down the current, forming a downslope region 15. Finally, one or more current transients may occur in a termination region 17 as the arc is extinguished. While the current waveform 98 illustrated in FIG. 6(*a*) represents the optimal case, most actual current waveforms will differ somewhat from the optimal waveform shown in FIG. 6(*a*).

Figure 6B:
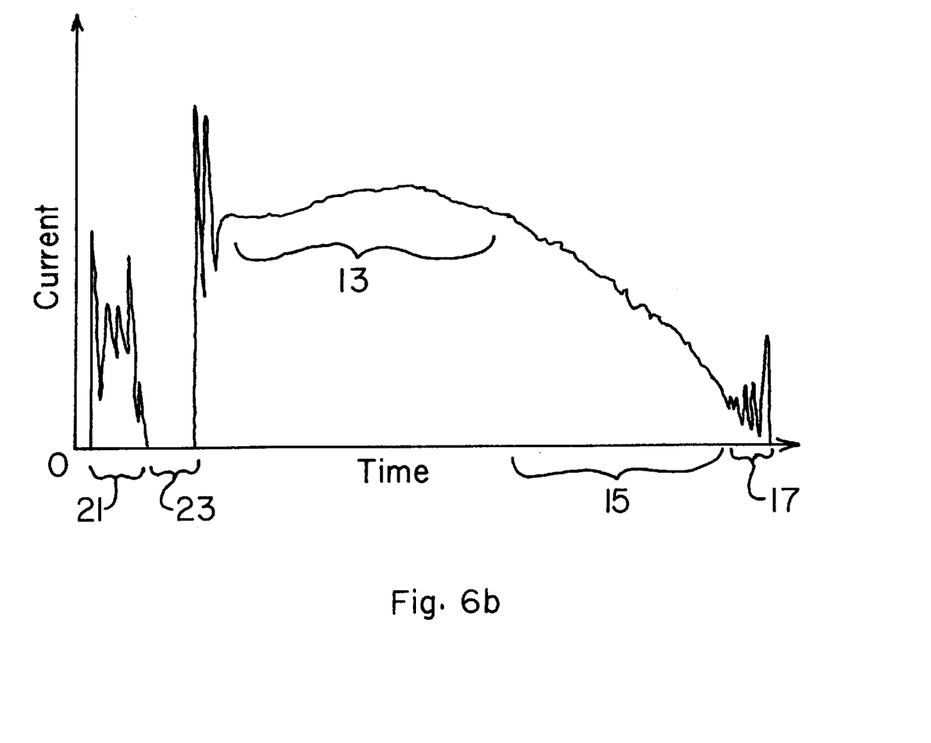
FIG. 6(b) is a plot of current vs. time for a deficient short duration spot weld operation.

With reference now to FIG. 6(*b*) a deficient waveform 19 may result in a poor quality spot weld. The deficient waveform 19 may be characterized by the presence of one or more "hash" regions 21. A hash region 21 may comprise one or more current spikes that are usually indicative of a like number of arc initiation events. Depending on the particular situation, the hash regions 21 may be separated by one or more "drop out" regions 23. A drop out region 23 usually corresponds to a complete extinguishing or "drop out" of the arc. The existence of such "hash" and/or "drop out" regions in the current waveform usually means that the resulting weld will be of poor quality.

Having considered both optimal and deficient waveforms 98 and 19, respectively, the short duration weld algorithm 34 is more easily understood. Essentially, the short duration weld algorithm 34 monitors the current in the arc via the current transducer 18 in order to derive the following welding process parameters:

Time duration of any drop-out regions 23;

Time duration of any hash regions 21;

Area under the current waveform (i.e., integrated welding current);

Average welding current;

Standard deviation of welding current;

Standard deviation of the downslope region 15;

Average standard deviation of any hash regions 21;

Maximum standard deviation of any hash regions 21;

Standard deviation of any hash regions 21 from 0–25 milliseconds (ms);

Standard deviation of any hash regions 21 from 25 milliseconds to the end of the welding period;

Time to the start of the downslope region 15; and

Slope of the downslope region.

The algorithm or method that is used by the short duration weld algorithm 34 to determine the numerical value for weld quality comprises two rules, Rule A and Rule B as follows:

Rule A: If the welding current is below a critical level for too long, then the weld is bad:

1. During the interval between the start of the weld and the time when the current starts on its scheduled downslope (i.e., region 15) the welding current is compared to a baseline welding current (referred to herein as "DropoutMax");

2. If the welding current is less than DropoutMax for a total time that is greater than the maximum allowable duration of a dropout region 23 (referred to herein as "DropoutLength"), then the weld is bad.

Rule B: If the weld does not start properly, then the weld is bad:

1. The weld period is divided into a series of "windows" (i.e., time periods). The standard deviation of the welding current is then calculated for each window;

2. If the standard deviation of the welding current for a given window is greater than a baseline standard deviation (referred to herein as "MaxStandardDev") for a time that is greater than a maximum allowable hash time 21 (referred to herein as "MaxHashTime"), then the weld is bad.

The specific baseline process parameters utilized by the short duration weld algorithm 34 may be determined according to the method 58 described above. Alternatively, the baseline parameters could be established from user-selected inputs or from the statistical data collected by the statistical process control module 38, as will be described in greater detail below.

Regardless of the particular method or process that is used to determine the baseline parameters, it should be remembered that the particular baseline parameter values will vary from process to process depending on the characteristics of the particular welding device 12, as well as on the type of part to be welded. Therefore, the present invention should not be regarded as being limited to any particular values for the baseline parameters. However, by way of example, in one preferred embodiment, the baseline parameters corresponding to the above-described welding process parameters are as follows:

DropoutMax: 5 A

DropoutLength: 35 milliseconds (ms)

Length of each 10 ms window for Rule B:

MaxStandardDev: 5 A

MaxHashTime: 50 ms

The foregoing process parameters are compared with corresponding baseline process parameters in accordance with Rules A and B above at step 50 (FIG. 3) of the method 42 for assessing weld quality in order to determine the quality of the weld. In the embodiment shown and described herein, the short duration algorithm 34 provides a numerical assessment of weld quality based on a scale of 1–4, with 1 being a poor quality weld and 4 being a good quality weld. The numerical weld quality assessment may be stored in an appropriate data file associated with the computer 26 and may be presented on the display system 28 as a red or green light, indicating a poor or good quality weld, as the case may be.

As was the case for the constant voltage algorithm 32 described above, the foregoing display functions associated with the short duration weld algorithm may be provided by means of the LabVIEW software contained on the computer 26. However, since the foregoing display functions may be easily provided on the LabVIEW software by persons having ordinary skill in the art after having become familiar with the teachings of the present invention, and since the programming steps and methods required to produce such display functions are not required to understand or practice the present invention, the particular programming steps and methods utilized in one preferred embodiment of the present invention to provide such display functions via the LabVIEW software will not be described in further detail herein.

The pulsed current analysis module 36 is utilized in pulsed current gas metal arc welding (GMAW) processes. The pulsed current analysis module 36 utilizes the current waveform sensed by the current transducer 18 to derive the mean and standard deviation of peak current, peak voltage, background (i.e., base) current, background voltage, pulse width (i.e., duty cycle), and pulse frequency. In the embodiment shown and described herein, the foregoing welding process parameters are presented for the user on the display device 28 associated with the computer 26. That is, the pulsed current welding process parameters are not compared with any baseline pulsed current welding parameters. That is, process step 50 FIG. 3) is not performed by the pulsed current analysis module 36. Instead, the system operator may perform his or her own analysis of the pulsed current welding process parameters. Thereafter, if need be, the system operator may manually adjust the welding system power supply (not shown) to change some or all of the parameters, thus effect a change in the quality of the weld. Alternatively, the pulsed current analysis module 36 could be provided with baseline process parameters and a method or algorithm for comparing the monitored process parameters with the baseline parameters to make a determination of weld quality.

The system operator may also select the statistical process control module 38. As mentioned above, in the embodiment shown and described herein, the statistical process control module 38 is available for use with GMAW welding processes (i.e., the constant voltage algorithm 32 and pulsed current analysis module 36), but is not available for use with GTAW welding processes (i.e., the short duration weld algorithm 34). However, in an alternative embodiment, the statistical process control module 38 could be made available for use with the short duration weld algorithm 34 by making the appropriate changes to the software, as would be obvious to persons having ordinary skill in the art after having become familiar with the teachings of the present invention.

Regardless of the particular module or algorithms for which the statistical process control module 38 may be made available, the statistical process control module 38 provides a means whereby the system operator may access and study statistical data representative of a plurality of individual weld operations. The statistical data provided by the statistical process control module 38 allows the system operator to discover and track certain trends in the welding process. The statistical process control module 38 may also allow the system operator to directly compare the welding process parameters with the corresponding baseline parameters.

Essentially, the statistical process control module 38 tracks (i.e., monitors and stores) the various welding process parameters that are associated with the particular welding process. For example, if the welding process to be performed comprises constant voltage GMAW, then the statistical process control module 38 will track (i.e., monitor and store) the welding process parameters associated with the constant voltage GMAW process, as described above.

Similarly, if the welding process to be performed comprises pulsed current GMAW, then the statistical process control module will track the welding process parameters associated with that process, as described above.

In the embodiment shown and described herein, the particular welding process parameters that are tracked (i.e., monitored and stored) by the statistical process control module 38 are user-selectable. That is, the user may instruct the module 38 to track nearly any desired welding parameter, provided, of course, that the desired welding parameter may be obtained from the data produced by the various sensors and transducers 16, 18, 20 (FIG. 1). Such user-selectable functionality may be provided by means of the appropriate program menus, icons, fields, etc., suitable for allowing a user to make such selections. However, since techniques for providing such functionality in computer software are well-known in the art, the particular techniques utilized in one preferred embodiment of the present invention will not be described in further detail herein.

The statistical process control module 38 may be configured to monitor the welding process parameters for any number of individual weld operations. The statistical process control module 38 may also be configured to store the welding process parameters for a given number of weld operations. For example, in the embodiment shown and described herein, the statistical process control module 38 is configured to allow the user to instruct the statistical process control module 38 to monitor and store the welding process parameters for up to 25 individual weld operations. Alternatively, the module 38 may be configured to monitor store the welding process parameters for greater or lesser number of individual weld operations.

In addition to tracking (i.e., monitoring and storing) the various types of welding process parameters for a number of individual weld operations, the statistical process control module 38 may also compare (i.e., perform step 50) the welding process parameters with the corresponding baseline parameters in accordance with the particular comparison routines described above for the constant voltage algorithm 32 and the short duration algorithm 34. If so, the statistical process control module 38 will present for each weld operation an assessment of parameter compliance and/or weld quality.

The baseline parameters used by the statistical process control module 38 in the comparison process (i.e., step 50) may be determined according to the method 58 illustrated in FIG. 4. Alternatively, in another embodiment of the invention, the baseline parameters could comprise user-specified limits. In still another embodiment, the baseline parameters utilized by the statistical process control module 38 may be developed in accordance with statistical data gathered by the statistical process control module 38 itself.

If the baseline parameters are to be selected in accordance with user-specified limits, the module 38 will prompt the user to input for each baseline parameter an upper limit, a lower limit, and a multiplier. As the terms imply, the upper and lower limits represent the endpoints of the user-specified parameter range. For example, if the baseline parameter is average current, then the upper limit will represent a maximum average current level, while the lower limit will represent a minimum average current level. The multiplier is used to scale the user-specified limits based on a multiple of the standard deviation. From these user-specified variables, the statistical process control module 38 calculates an upper control limit (UCL) and a lower control limit (LCL) as follows:

$$UCL = \frac{(\text{Upper Limit} - \text{Lower Limit})}{2} + (\text{multiplier} * \text{std. deviation}) \quad (1)$$

$$LCL = \frac{(\text{Upper Limit} - \text{Lower Limit})}{2} - (\text{multiplier} * \text{std. deviation}) \quad (2)$$

If the baseline parameters are to be selected in accordance with statistical data gathered by the statistical process control module 38, the module 38 will prompt the user to input for each baseline parameter a multiplier for the standard deviation. As was the case for the input of user-specified limits described above, the multiplier is used to scale the parameter limits based on a multiple of the standard deviation. The statistical process control module 38 then calculates an upper control limit (UCL) and a lower control limit (LCL) as follows:

$$UCL = (\text{Parameter Mean}) + (\text{multiplier} * \text{std. deviation}) \quad (3)$$

$$LCL = (\text{Parameter Mean}) - (\text{multiplier} * \text{std. deviation}) \quad (4)$$

Where the term "ParameterMean" is the arithmetic mean of the particular welding process parameter.

The statistical process control module 38 may present the various welding process parameters for the most recently performed weld in chart or graphical form on the display device 28. The baseline parameters or user-defined limits may also be presented on the display 28 to allow the system operator to readily determine whether the monitored process parameter is in compliance with either the baseline parameter or user-defined limit, as the case may be. For example, if the welding process being performed is a constant voltage GMAW welding process, the statistical process control module 38 may present on the display 28 a chart or graph of welding current vs. time. Since several welding process parameters are usually tracked for each type of weld process, the statistical process control module 38 may provide suitable icons on the display 28 to allow the system operator to display the various different process parameters.

Optionally, and in the embodiment shown and described herein, the display may also be provided with one or more icons corresponding to the other, non-displayed parameters to provide the system operator to instantly identify those parameters that are non-compliant with the baseline parameters or user-selected limits, as the case may be. By way of example, in the embodiment shown and described herein, the icons may simulate "lights" or "LEDs" and may switch colors from green to red to indicate compliant or non-compliant parameters, respectively.

The statistical process control module 38 may also be provided with the ability to present on the display 28 a cumulative chart or graph of a specific process parameter. The cumulative chart may be a display that contains the mean process parameter for every weld that has been completed by the welding device 12 and tracked by the statistical process control module 34. Such a cumulative display of process parameters allows the system operator to directly compare all of the individual welds completed by the welding device 12, thus determine the existence of any progressive trends or shifts that might have occurred in the welding process over time. Here again, since the statistical process control module 38 only displays a chart of a single process parameter at any given time, the display may be provided with one or more icons to allow the system operator to select and display other cumulative process parameters tracked by the statistical process control module 38. The display may also be provided with one or more icons corresponding to the other, non-displayed cumulative parameters to allow the system operator to readily ascertain whether the other, non-displayed cumulative process parameters are in compliance with the baseline parameters or user selected limits, as the case may be. By way of example, in the embodiment shown and described herein, the icons may simulate "lights" or "LEDs" and may switch colors from green to red to indicate compliant or non-compliant parameters, respectively.

If such a cumulative chart is desired to be displayed, the baseline parameters could again comprise either user-specified limits or calculated limits. However, for the case of user-specified limits, the UCL and LCL baseline values are simply the user-defined "UpperLimit" and "LowerLimit" without any adjustment for standard deviation. That is, for equations (1) and (2) above the multiplier is set equal to zero. For calculated limits, the multiplier for equations (3) and (4) above is set equal to three.

In the embodiment shown and described herein, the foregoing display functions are provided by means of programming the LabVIEW software contained on the computer 26. However, since the foregoing display functions may be easily provided on the LabVIEW software by persons having ordinary skill in the art after having become familiar with the teachings of the present invention, and since the programming steps and methods required to produce such display functions are not required to understand or practice the present invention, the particular programming steps and methods utilized in one preferred embodiment of the present invention to provide such display functions via the LabVIEW software will not be described in further detail herein.

It is generally preferred, but not required, to provide the statistical process control module 38 with a "run rule" algorithm to allow the system operator to define when process parameter non-compliance will cause a noncompliance indication (e.g., turn the "light" or "LED" icon from green to red) on the display 28. Such a provision allows the system operator some flexibility in defining the requirements of a parameter "violation." For example, in the embodiment shown and described herein, the run rules may be defined as follows:

One data point outside the baseline parameter limits;

Two out of three consecutive data points outside the baseline parameter limits;

Four out of five consecutive data points outside the baseline parameter limits;

Seven consecutive data points on one side of the "centerline" (i.e., the midpoint between the baseline parameter limits); and Six consecutive data points steadily increasing or decreasing.

Of course, other run rules may be provided, depending on the particular application, and as maybe desired for any particular application. Consequently, the present invention should not be regarded as limited to the particular run rules specified herein.

It is contemplated that the inventive concepts herein described may be variously otherwise embodied and it is intended that the appended claims be construed to include alternative embodiments of the invention except insofar as limited by the prior art.

We claim:

1. Apparatus for determining a quality of a weld produced by a welding device, comprising:

a sensor operatively associated with the welding device, said sensor being responsive to at least one welding process parameter during a welding process, said sensor producing a welding process parameter signal relating to the at least one welding process parameter;

a computer connected to said sensor, said computer being responsive to the welding process parameter signal produced by said sensor;

a user interface operatively associated with said computer, said user interface allowing a user to select a desired welding process;

a constant voltage algorithm operatively associated with said computer;

a short duration weld algorithm operatively associated with said computer; and a pulsed current analysis module operatively associated with said computer, said computer processing the welding process parameter signal produced by said sensor in accordance with one of said constant voltage algorithm, said short duration weld algorithm, and said pulsed current analysis module depending on the desired welding process selected by the user, said computer producing output data indicative of the quality of the weld.

2. The apparatus of claim 1, further comprising a signal processor connected between said sensor and said computer, said signal processor filtering the welding process parameter signal produced by said sensor to produce a filtered welding process parameter signal.

3. The apparatus of claim 2, wherein said sensor comprises a voltage sensor.

4. The apparatus of claim 2, wherein said sensor comprises a current sensor.

5. The apparatus of claim 2, wherein said sensor comprises a wire-feed sensor.

6. The apparatus of claim 1, further comprising a statistical process control module operatively associated with said computer, said statistical process control module storing the at least one welding process parameter signal.

7. A method for determining a quality of a weld produced by a welding device, comprising:

determining a desired welding process by selecting from among a constant voltage welding process, a pulsed current welding process, and a spot welding process;

selecting a welding process algorithm based on the desired welding process, said step of selecting a welding process algorithm comprising:

selecting a constant voltage algorithm if the desired welding process is determined to be the constant voltage welding process;

selecting a pulsed current analysis algorithm if the desired welding process is determined to be the pulsed current welding process; and selecting a short duration weld algorithm if the desired welding process is determined to be the spot welding process;

detecting the initiation of a welding process;

monitoring at least one welding process parameter during the welding process;

processing the at least one welding process parameter in accordance with the selected welding process algorithm to assess the quality of the weld; and producing a user-discernable indication of the quality of the weld.

8. The method of claim 7, wherein the step of processing the at least one welding process parameter in accordance with the constant voltage algorithm includes the step of determining a metal transfer mode.

9. The method of claim 8, wherein said step of determining a metal transfer mode includes the step of selecting whether the metal transfer mode comprises a spray mode, a gobular mode, a short circuiting mode, or a shorting streaming mode.

10. The method of claim 7, wherein said step of processing the at least one welding process parameter further comprises:

comparing the at least one welding process parameter with a baseline parameter; and determining whether said at least one welding process parameter is compliant with said baseline parameter.

11. The method of claim 10, further comprising the step of suggesting a parameter change if said at least one welding process parameter is not compliant with said baseline parameter.

12. The method of claim 7, wherein the step of processing the at least one welding process parameter in accordance with the short duration weld algorithm includes the step of assigning a numerical value to the quality of the weld.

13. The method of claim 12, wherein said step of processing the at least one welding process parameter further comprises:

comparing the at least one welding process parameter with a baseline parameter; and determining whether said at least one welding process parameter is compliant with said baseline parameter.

14. The method of claim 13, further comprising the step of suggesting a parameter change if said at least one welding process parameter is not compliant with said baseline parameter.

15. A method of operating a computer to determine a quality of a weld produced by a welding device, comprising:

determining a desired welding process by selecting from among a constant voltage welding process, a pulsed current welding process, and a spot welding process;

programming the computer to select a welding process algorithm based on the desired welding process, said step of programming the computer to select a welding process algorithm comprising:

instructing the computer to select a constant voltage algorithm if the desired welding process is determined to be the constant voltage welding process;

instructing the computer to select a pulsed current analysis algorithm if the desired welding process is determined to be the pulsed current welding process; and instructing the computer to select a short duration weld algorithm if the desired welding process is determined to be the spot welding process;

detecting the initiation of a welding process;

monitoring at least one welding process parameter during the welding process;

processing the at least one welding process parameter in accordance with the selected welding process algorithm to assess the quality of the weld; and producing a user-discernable indication of the quality of the weld.

* * * * *